(No Model.)
R. G. BROWN.
COFFEE POT.
No. 480,066. Patented Aug. 2, 1892.
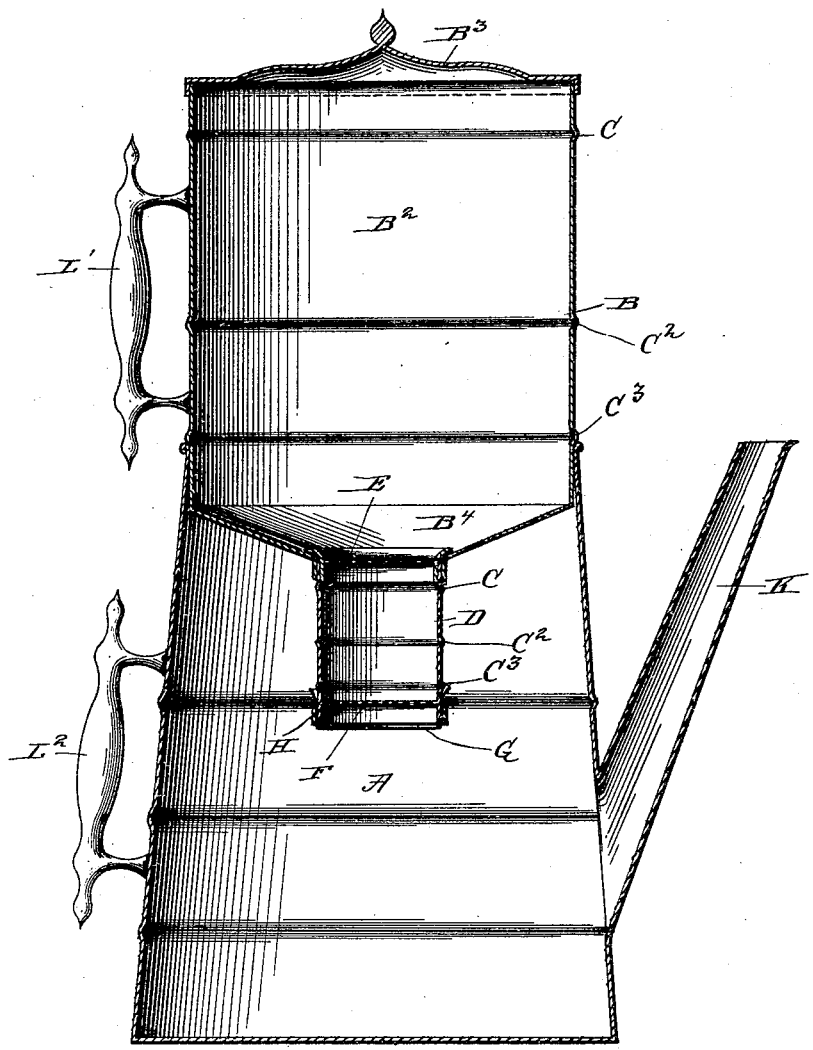
Witnesses
W. H. Pumphrey.
N. C. Evert
Inventor
Robert G. Brown
By his Attorneys
Myers & Co.

UNITED STATES PATENT OFFICE.

ROBERT G. BROWN, OF KANSAS CITY, KANSAS.

COFFEE-POT.

SPECIFICATION forming part of Letters Patent No. 480,066, dated August 2, 1892.

Application filed March 17, 1892. Serial No. 425,354. (No model.)

*To all whom it may concern:*

Be it known that I, ROBERT G. BROWN, a citizen of the United States of America, residing at Kansas City, in the county of Wyandotte and State of Kansas, have invented certain new and useful Improvements in Coffee-Pots, of which the following is a specification, reference being had therein to the accompanying drawing.

This invention relates to coffee-pots, more particularly to that class employed in the production of what is known as "drip-coffee."

The objects of the invention are to produce a coffee-pot of such peculiar construction whereby the operation, after the necessary ingredients have been placed in their respective holders or chambers, shall be automatic; furthermore, to provide separate chambers for the ingredients, such as an upper or water chamber, an intermediate or solid-coffee chamber, and a lower or liquid-coffee chamber, by which arrangement the weight of the water above the coffee tends to exert a pressure thereon and, as will be obvious, improves the quality of the coffee; furthermore, to provide the chambers with corresponding graduated marks whereby the amount of water to be used may be regulated; furthermore, in the use of suitably-disposed strainers located in the intermediate coffee-chamber, by which pulverized coffee may be used without danger of mixing with the water, and finally in proportioning the parts to allow the upper chambers to be removed, leaving the lower chamber containing only the finished coffee, and the lid of the upper chamber adapted to form a covering for said lower chamber when the operation has been completed.

With these objects in view the invention consists in the combination of a vessel having the usual spout and handle designed to contain liquid coffee, water and coffee chambers formed integral and adapted to be superimposed in said vessel and the water-chamber provided with a cover to be used in connection with the lower or liquid-coffee chamber, as described; furthermore, suitable strainers arranged in the intermediate coffee-chamber, whereby very finely ground or pulverized coffee may be used without danger of intermingling or mixing with the water in the chamber above; furthermore, in providing the vessels with corresponding graduating-marks, by which the proportion of the several ingredients may be readily determined, and finally the invention consists in various novel details of construction whereby the several objects are attained.

In the drawing forming part of this specification, in which like letters of reference indicate corresponding parts, I have illustrated one form of construction embodying the several features heretofore mentioned and which will be hereinafter more specifically described, and pointed out in the claims.

In the drawing a central longitudinal sectional view of the apparatus is shown, illustrating the relative position of the several parts, in which A indicates an ordinary form of vessel having the usual spout K and handle $L^2$. Superimposed on this vessel is a second vessel B, comprising an upper or water chamber $B^2$, having a lid or cover $B^3$, a handle $L'$, and a conical bottom $B^4$, which tapers to the diameter of an intermediate chamber D, designed to contain the solid coffee. This chamber D is provided near its mouth with a removably-secured reticulated disk or strainer E, adapted to confine the particles of coffee against escapement therefrom or intermingling with the water in the chamber above. A second reticulated disk or strainer F is arranged directly over a cloth strainer G in such position as to support the coffee and allow the liquid contents to drip through freely and receive a last cleansing without interference from the compact mass or coffee-pulp in the upper portion of the chamber.

The cloth strainer G is formed of a piece of cotton cloth secured over the mouth of the chamber D by means of the ring H, which is forced into position by a slight pressure, as will be readily seen.

C, $C^2$, and $C^3$ represent graduated markings on the vessels B D in the form of beads, by which the ingredients may be conveniently proportioned to produce a predetermined quantity of coffee.

The operation in the production of coffee by the use of the apparatus is as follows: For example, if it is desired to make one cup of coffee the upper strainer E is removed and ground coffee is placed in the chamber D to the depth of the first mark or bead, and then boiling water is poured into the chamber B² to a depth of the corresponding bead, and the operation begins by the water passing through, first, screen E; second, the coffee-pulp; third, the screen F, and, finally, through the cloth screen G into the lower or receiving vessel A. After the dripping has ceased the upper vessel B is removed and the cover thereof placed over the lower vessel A, containing only the finished coffee, which is ready for serving.

Having thus fully described my invention, what I claim as new, and desire to secure by Letters Patent, is—

The combination, with an apparatus comprising a lower or receiving vessel having a spout and handle, of a superimposed vessel removably secured thereon and consisting of two chambers for the reception of tea or coffee and water, the upper or water chamber having a cover adapted to be used in connection with the lower or receiving chamber, and an approximately conical bottom tapering to the diameter of the intermediate or coffee chamber, the latter being provided with a removably-secured reticulated disk or strainer at or near its upper end, a second strainer at or near the lower end on which the substance contained therein is supported, a third strainer arranged over the mouth of said chamber and held in position by a friction-ring, and the beads C, C², and C³, formed on the upper or water chamber and the intermediate or coffee chamber to facilitate a proper proportioning of the ingredients, substantially as described, and for the purpose set forth.

In testimony whereof I affix my signature in presence of two witnesses.

ROBERT G. BROWN.

Witnesses:
W. W HASKELL,
WILL T. WALKER.